(12) United States Patent (10) Patent No.: US 8,561,151 B2
Dorsey et al. (45) Date of Patent: Oct. 15, 2013

(54) MOBILE SOFTWARE ENTITLEMENTS MANAGER

(75) Inventors: James Christopher Dorsey, Chelmsford, MA (US); Richard Gianattasio, Wellesley, MA (US); Michael E. Phillips, Melrose, MA (US)

(73) Assignee: Avid Technology, Inc., Burlington, MA (US)

( * ) Notice: Subject to any disclaimer, the term of this patent is extended or adjusted under 35 U.S.C. 154(b) by 124 days.

(21) Appl. No.: 13/070,951

(22) Filed: Mar. 24, 2011

(65) Prior Publication Data

US 2012/0246704 A1 Sep. 27, 2012

(51) Int. Cl.
*G06F 7/04* (2006.01)

(52) U.S. Cl.
USPC .................. 726/4; 713/165; 705/59; 726/3

(58) Field of Classification Search
USPC .......................................... 455/411
See application file for complete search history.

(56) References Cited

U.S. PATENT DOCUMENTS

| | | | |
|---|---|---|---|
| 2004/0039916 A1* | 2/2004 | Aldis et al. .................... | 713/177 |
| 2005/0076208 A1* | 4/2005 | Hori et al. ..................... | 713/165 |
| 2005/0132347 A1* | 6/2005 | Harper et al. ................. | 717/168 |
| 2005/0289072 A1* | 12/2005 | Sabharwal ...................... | 705/59 |
| 2006/0122940 A1* | 6/2006 | Coley et al. ..................... | 705/59 |
| 2008/0155144 A1* | 6/2008 | Helmecke et al. .............. | 710/72 |
| 2008/0262968 A1* | 10/2008 | Saxena et al. .................. | 705/51 |
| 2010/0107258 A1* | 4/2010 | Park et al. ...................... | 726/26 |
| 2010/0138305 A1* | 6/2010 | Brignull et al. ............ | 705/14.66 |
| 2010/0280892 A1* | 11/2010 | Uzunalioglu et al. ..... | 705/14.13 |
| 2012/0079577 A1* | 3/2012 | Hao et al. .......................... | 726/7 |
| 2012/0147824 A1* | 6/2012 | Van Der Merwe et al. ... | 370/329 |

* cited by examiner

*Primary Examiner* — Philip Chea
*Assistant Examiner* — Khoi Le
(74) *Attorney, Agent, or Firm* — Oliver Strimpel

(57) ABSTRACT

A mobile entitlements manager implemented on a mobile device stores the software entitlements belonging to a user of the mobile device. The mobile device communicates with client computers on which the user wishes to run software applications. Messages are exchanged between the client and the mobile device to enable activation, continued running, and to deactivate client applications in accordance with the entitlements available to the user. The mobile entitlements manager updates its entitlement information by communicating with a remote entitlements server, and informs the entitlement server of the status of programs running on clients in communication with the device. The entitlements manager handles entitlements for multiple applications and for multiple licensed entities, such as individual users, sites, client computers, or organizations.

16 Claims, 4 Drawing Sheets

| Entitlements Manager | | |
|---|---|---|
| Entitlements | Applications | Account |
| Entitlement  A↓Z | Renewal Date | |
| Company A | | |
| Product X | 4/6/2013 | |
| Product Y | 6/3/2015 | |
| Company B | | |
| Product A | 6/3/2015 | |
| Product B | 6/3/2015 | |
| Product C | 6/3/2015 | |

Sync Entitlements

Status: connected

*FIG. 4*

MOBILE SOFTWARE ENTITLEMENTS MANAGER

BACKGROUND

Manufacturers of software applications use various methods of managing their customers' access to their software based on the presence and nature of a valid customer software license. Software-based methods involve periodic communication between the client system running the application and a remote server that checks to see whether the client has a valid license to the software. If the remote server determines that a license is in effect, the functionality corresponding to that license is enabled. Conversely, if a license is not in effect, some or all of the application's functionality is disabled, or remains deactivated on the client. The license may be tied to a particular client system, or to a particular user. User-based licensing has the advantage of enabling a user to access the application from more than one client system. Such software-based methods require a connection to the remote server that stores the licensing information. This can pose a problem for applications running on clients with no Internet or other remote connection, a situation that commonly arises for clients requiring a high degree of network security.

Another popular license management method is based on the use of a hardware key. A hardware key is a small device, such as a flash memory stick, that permits a software application on a client to run when it is plugged into the client. Hardware keys have the advantage of portability and transferability, enabling any user in possession of the key to run the licensed application on any client that has the requisite software loaded onto it, while still enabling the manufacturer to limit the license to a single active instance of the software application. Hardware keys can be inconvenient, however, when users lose or damage them, with attendant delays before receiving a replacement.

SUMMARY

A mobile device serves as a mobile entitlement server for a software application running on a client that is in communication with the mobile device. The mobile device maintains current entitlement information via communication with a remote entitlement server.

In general, in one aspect, a method of controlling usage of a software application running on a client computer includes: receiving at a mobile device a request from the client computer to authorize the running of the software application on the client computer, wherein the request includes identification information; comparing the identification information with entitlement information stored on the mobile device; and if the entitlement information stored on the mobile device includes a valid entitlement corresponding to the identification information, sending to the client computer an authorization message, wherein the authorization message, when received by the client computer, enables the client computer to continue running the software application on the client computer.

Various embodiments include one or more of the following features. Repeating the actions described in the previous paragraph at pre-specified intervals. If the entitlement information stored on the mobile device does not include a valid entitlement corresponding to the identification information, sending a deactivation message to the client computer to deactivate the software application. The deactivation message causes the software application to become at least partially inoperative on the client computer after a predetermined time interval after receipt of the deactivation message by the client computer. If the entitlement information stored on the mobile device includes a valid entitlement corresponding to the identification information, sending to a remote entitlement server over a wide area network an indication that a copy of the software application is running under the valid entitlement corresponding to the identification information. In response to receiving the authorization request from the client and prior to the comparing step: requesting updated entitlement information from a remote entitlement server; receiving from the remote entitlement server, updated entitlement information; and updating the stored entitlement information with the updated entitlement information. The identification information identifies a user of the client computer, and/or the client computer. The receiving and sending steps are implemented via a wireless or a wired connection between the mobile device and the client computer. Entitlement information for a plurality of software applications, including the first-mentioned software application, is stored on the mobile device, and the mobile device receives authorization requests for each of the plurality of software applications and responds by sending one of an authorization message and a deactivation message directed to each of the plurality of software applications. If a response to the request from the client computer to authorize the running of the software application on the client computer is not received by the client computer, the software application is rendered at least partially inoperative on the client computer after a predetermined time interval after the request from the client computer to authorize the running of the software application was sent. The mobile device is a smart phone, tablet computer, netbook computer, or other mobile system.

In general, in another aspect, a method of controlling activation of a software application on a client computer includes: receiving at a mobile device an activation request from the client computer to activate the software application, wherein the activation request includes identification information, and wherein the client computer sends the activation request to the mobile device in response to a request from a user of the client computer to activate the software application on the client computer; comparing the identification information with entitlement information stored on the mobile device; and if the entitlement information stored on the mobile device includes a valid entitlement corresponding to the identification information, sending an activation message to the client, wherein receipt of the activation message enables the user to activate the software application on the client.

Various embodiments include one or more of the following features. Outputting on the mobile device a notification of receipt of the activation request and a request for permission from a user of the mobile device to activate the software application on the client computer, and only sending the activation message if permission from the user of the mobile device is received. The valid entitlement information corresponding to the identification information includes entitlements for a licensed number of copies of the software application, and sending the activation message is conditional upon a number of currently activated copies of the software application being less than the licensed number. The mobile device maintains a record of the number of currently activated copies of the software application. The mobile device updates a remote entitlement server when the number of currently activated copies of the software application changes. Enabling a user of the mobile device to purchase an entitlement for the software application by executing an electronic transaction with a remote entitlement server, and updating the entitlement information stored on the mobile device to reflect the purchase.

In general, in a further aspect, a computer program product comprises: storage including instructions for a processor to execute, such that when the processor executes the instructions a process for controlling usage of a software application running on a client computer is performed, the process comprising: receiving at a mobile device a request from the client computer to authorize the running of the software application on the client computer, wherein the request includes identification information; comparing the identification information with entitlement information stored on the mobile device; and if the entitlement information stored on the mobile device includes a valid entitlement corresponding to the identification information, sending to the client computer an authorization message, wherein the authorization message, when received by the client computer, enables the client computer to continue running the software application on the client computer.

In general, in yet another aspect, a mobile device comprises: a processor for executing instructions; a wireless network interface connected to the processor; a memory connected to the processor, the memory including instructions which, when executed by the processor, cause the portable device to implement a process for controlling usage of a software application running on a client computer is performed, the process including: receiving via the wireless network interface a request from the client computer to authorize the running of the software application on the client computer, wherein the request includes identification information; comparing the identification information with entitlement information stored in the memory; and if the entitlement information stored on the mobile device includes a valid entitlement corresponding to the identification information, sending to the client computer via the wireless network interface an authorization message, wherein the authorization message, when received by the client computer, enables the client computer to continue running the software application on the client computer.

BRIEF DESCRIPTION OF THE DRAWINGS

FIG. 4 is illustrates a user interface of a mobile entitlements manager.

DETAILED DESCRIPTION

Users of mobile devices store personal information on their mobile devices, such as cell phones, smart phones, and tablet computers. Such information typically includes their address book, calendar, pictures, passwords, and increasingly media such a video and audio. The methods and systems described herein provide a distinct, additional functionality to a mobile device user through an entitlements application on the mobile device that receives, manages, and stores software entitlement information. Such functionality in effect turns a mobile device into a virtual hardware key, and eliminates the need for a licensed software application user to carry a separate licensing repository device. As used herein, the term virtual hardware key refers to an entitlements manager application running on a mobile device. Elimination of hardware-based repositories reduces the risk of losing entitlements by losing or damaging a hardware key. It also enables entitlements to be managed and applications to be activated on clients without Internet connectivity. Furthermore, a virtual hardware key can handle entitlements for multiple different software applications and software plug-ins, as well as entitlements that permit more than a single copy of a licensed application to run at the same time on different clients.

Figure 1:
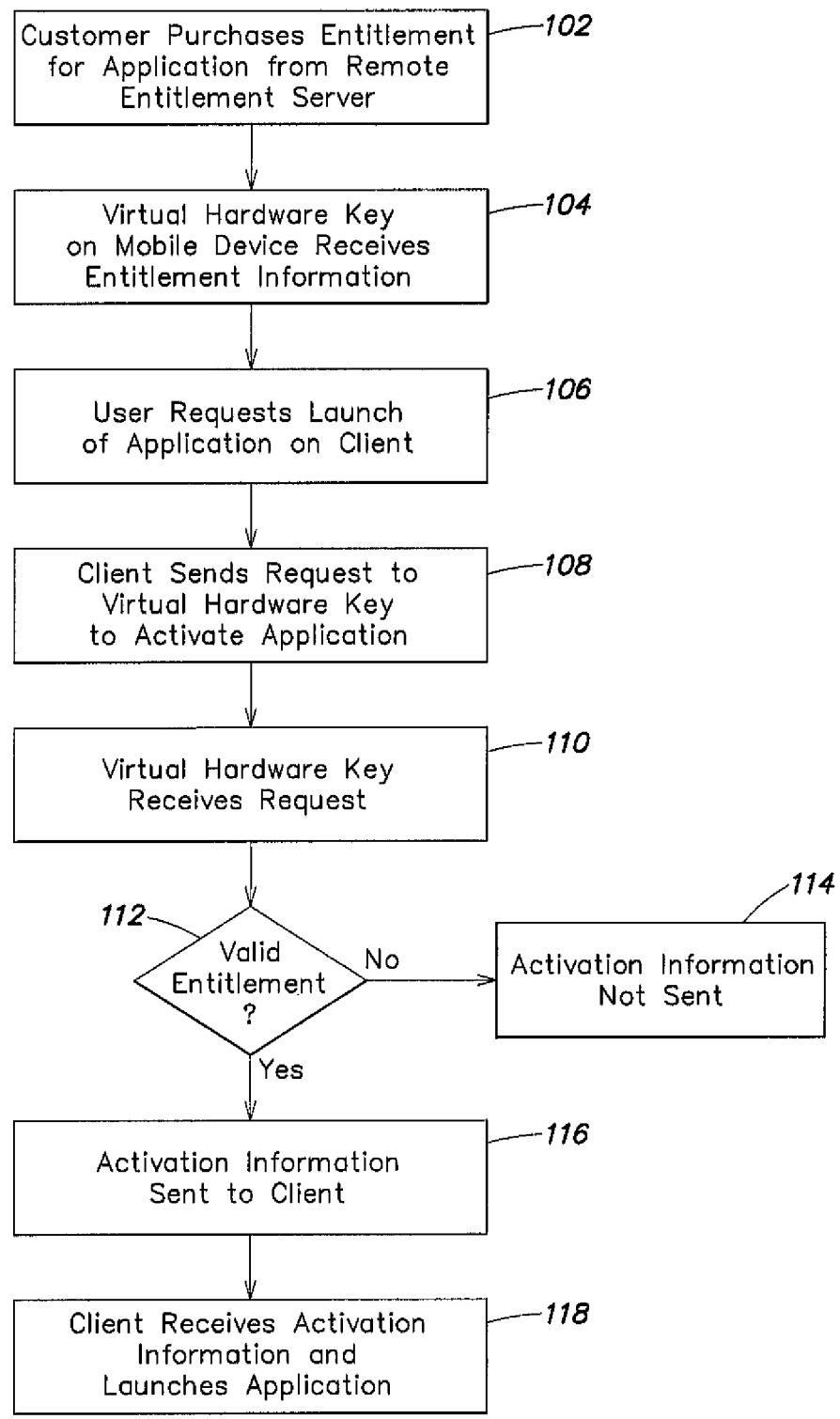
FIG. 1 is a high level flow diagram of the steps involved in purchasing entitlements and launching a client application enabled by a virtual hardware key.
Figure 3:
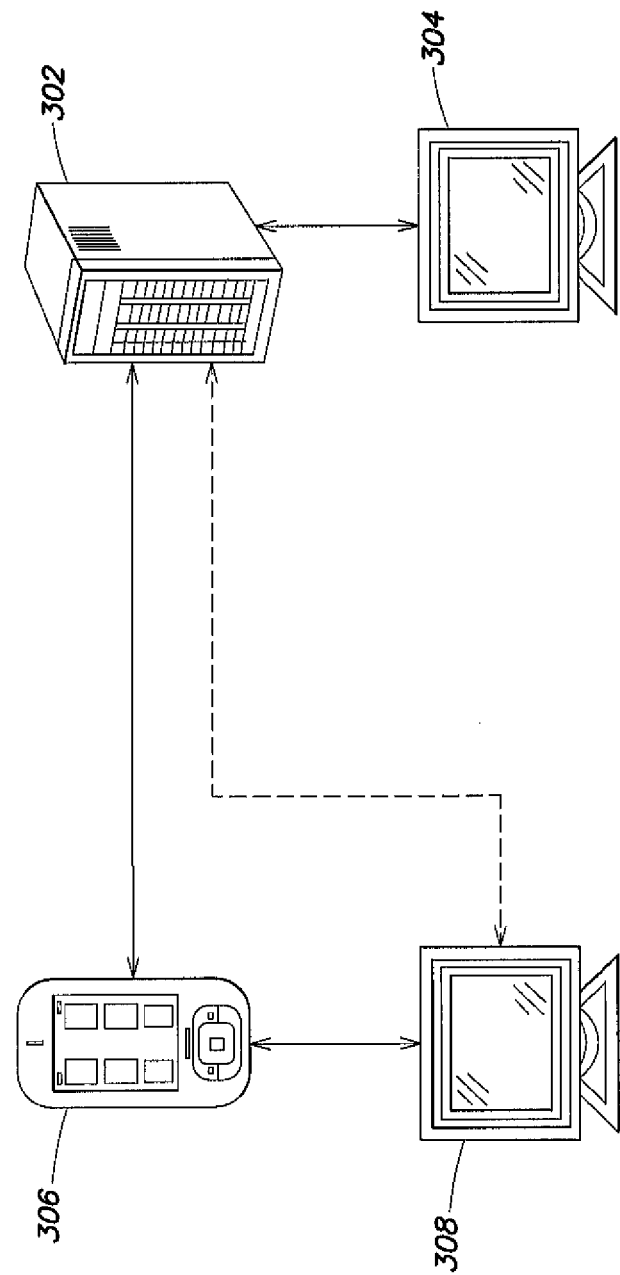
FIG. 3 is a high level block diagram showing components of a system for implementing a mobile entitlements manager.

FIG. 1 is a high level flow diagram of the steps involved in purchasing entitlements and launching a client application enabled by a virtual hardware key. A high level block diagram of the components involved in a virtual hardware key software authorization scheme is shown in FIG. 3. Before being able to run a software application, the customer needs a valid entitlement, such as an individual or a site license. This can be obtained, for example, by purchasing it from entitlement server 302 using any Internet-connected client, such as a thin client connected to the Internet (304), client 308 that is to run the software application (if it has Internet connectivity), or virtual hardware key mobile device 306, via an e-commerce transaction (step 102). The remote entitlement server maintains a complete and up-to-date record of each customer's entitlements.

The virtual hardware key includes an entitlements manager software application that runs on mobile device 306, and enables the mobile device to manage some or all of the entitlements to which the mobile device user has access. These may be individual client licenses, site licenses, corporate client licenses, or involve other licensing entities or licensing schemes. The mobile device is able to communicate with the remote entitlement server via the cell network to receive current entitlement status from the remote server, and report to the server the activation status of the various software applications in communication with the mobile entitlements server. This synchronization may be initiated by the mobile device user at any time (as long as the mobile device has connectivity), or occur in accordance with a predetermined schedule of update requests, e.g., periodic, such as once a day or once a week. The virtual hardware key may also receive update transmissions initiated by the entitlements server when entitlement changes occur. Such changes include the purchase of new entitlements, the expiration or cancellation of entitlements, or a change in licensing terms and conditions. Thus, after the customer purchase of an entitlement, the virtual hardware key receives a notification of the updated entitlement status of the customer (step 104), either as a result of a notification message initiated by the remote server, or in response to a user-initiated, periodic or prescheduled update request from the virtual hardware key.

We now describe the process of authorizing the licensed software application to run on client 308, which is in wireless or fixed communication with the mobile device. When a user requests the launching of the software application on the client (step 106), the client computer seeks authorization to run. The software application may offer various authorization options, such as a hardware key, direct communication with the remote entitlement server via the Internet, or by virtual hardware key. The client may automatically default to the virtual hardware key option if an applicable virtual key is detected, or the choice may require user input.

If virtual hardware key authorization is selected, the client sends out a request for authorization over a local network via a wireless connection (step 108). The request includes information that identifies the entity seeking authorization, which includes one or more of a user, customer, client, and site identification. The request also specifies the software application for which authorization is being sought, and optionally additional details pertaining to the user, the client computer, and the software application. The virtual hardware key receives the request (step 110), and checks to see if its entitlement data includes a valid entitlement for the requested software application for the requesting entity (step 112). If no valid entitlement corresponding to the received request is found, the virtual hardware key does not send activation information (step 114), optionally sending instead a message that no valid entitlement was found together with an invitation to acquire an entitlement, or authorization that permits the software application to run with limited functionality or for a limited time period (trial entitlement). On the other hand, if a valid entitlement is found, the virtual hardware key sends authorization for the application to be activated (step 116), and after the client receives authorization, the user is able to launch the application (step 118).

Figure 2:
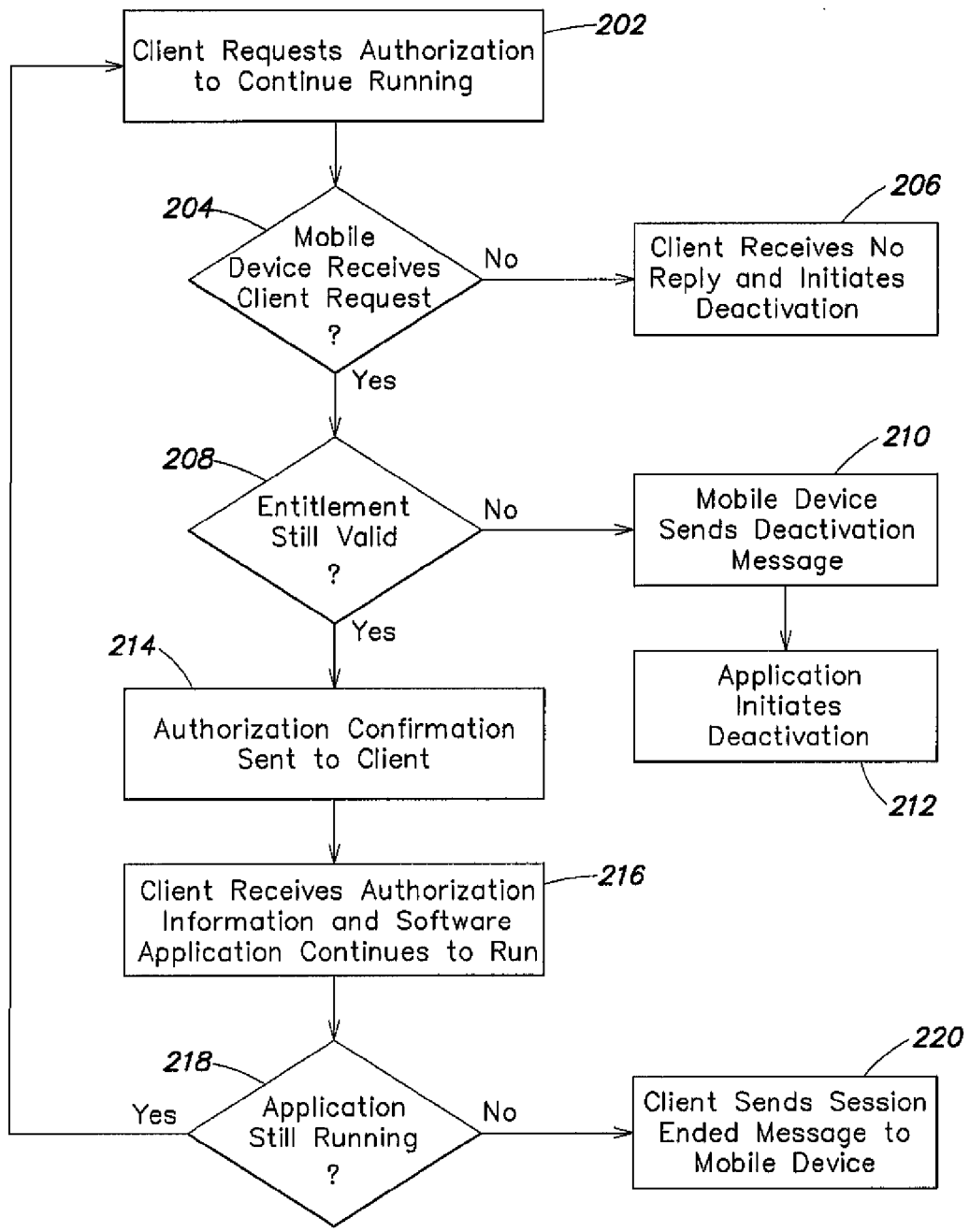
FIG. 2 is a high level flow diagram illustrating the communication between the client and the virtual hardware key while the application is running on the client.

FIG. 2 is a high level flow diagram illustrating the communication between the client and the virtual hardware key after initial activation of an application, i.e., when the application is already running on the client. Once activated, ongoing authorization checks (FIG. 2, step 202) may be requested by the software application for various reasons. First, it may be necessary to determine whether the entitlement has expired after reaching the end of a fixed entitlement period. Second, for entitlements that permit more than one copy of the application to run at a time, all copies may been issued to other users that have higher priority, and no copy of available for the continued use of the requesting copy. Third, publishers may stipulate periodic authorization checks for security or user survey reasons.

The next step depends on whether or not the mobile device receives the request (204). If the mobile device is still within range of the client computer running the software application (or if it is physically connected, e.g., via a USB port), the message is received by the mobile device. However, if the mobile device is no longer able to receive messages from the client because it has moved out of range, been switched off, or run out of batteries, the message will not be received. In this case, the client will not receive a reply at all from the mobile device, and ongoing authorization to keep the application running is unavailable. The software application is then deactivated (206) according to a schedule determined by the software vendor or licensing entity. The user of the application is notified of the lack of authorization, and may be given a fixed time before inactivation of the application in which either to retrieve the virtual hardware key, or seek another means of authorization. Failing that, the application becomes partially or fully inoperative.

If the ongoing authorization request message is received by the mobile device, it checks to see if it still has a valid entitlement for the requesting entity (208). If no valid entitlement exists, a deactivation message is sent back to the client (210), which then initiates the deactivation procedure (212). On the other hand, if a valid authorization is found, a confirmation message is sent to the client (214). Receipt of a confirmation message enables the software application to continue to run without any interruption (216). If the application is still running (218), the authorization check cycle then repeats, and after an interval of time, another ongoing authorization request message is sent.

Upon ending the software application session, or when the next periodic check cycle discovers that the application is no longer running, the client sends a message to the mobile device to notify it that the session has ended (220). The entitlements manager then updates its record of the application's status, and relays it to the remote entitlement server, either in response to receiving the session ended message, or as part of a regularly scheduled entitlement status update. The mobile device can support multiple processes, as described above, entitling multiple applications or sub-components (e.g., plug-ins) consecutively.

To protect the security of mobile entitlement management, the communication between the mobile device, the client, and the remote entitlement server is encrypted, using wireless encryption algorithms and methods well known in the art.

In the described embodiment, the mobile entitlement manager software application includes a user interface, such as that shown in FIG. 4, which lists all the entitlements available to the user of the mobile device, along with temporal data, such as renewal dates, initial activation dates, and any relevant temporal restrictions or parameters. The application may sort the entitlements by product manufacturer, or according to the multiple accounts to which the user has access, or may show a consolidated alphabetically arranged list by company or by client application product name. The entitlements manager may also highlight, or list separately the licensed applications that are currently activated. When updates or upgrades of the user's entitlements become available, the user is notified, for example, by displaying a corresponding icon. A "sync entitlements" button enables the user to request updated entitlement information from the remote entitlement server. This action may also cause the mobile device to send to the server updated activation status information.

A mobile entitlements manager as described herein may be implemented as a computer program using a general-purpose computer system. Such a computer system may be an integrated portable system, which typically includes an integrated processing unit connected to both an integrated output that displays information to a user and an input that receives input from a user. The processing unit generally includes a processor connected to a memory system via an interconnection mechanism. The input and output are also connected to the processor and memory system via the interconnection mechanism.

One or more output devices may be connected to the computer system. Example output devices include, but are not limited to, liquid crystal displays (LCD), touch screens, plasma displays, OLED displays, video projection systems and other video output devices, loudspeakers and other audio output devices; printers, devices for communicating over a low or high bandwidth network, including network interface devices, cable modems, and storage devices including solid state devices such as flash memory, or magnetic media such as disk or tape. One or more input devices may be connected to the computer system. Example input devices include, but are not limited to, a touch screen, keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connection may be via a fixed connection, such as via an Ethernet network, or via a wireless connection, such as Wi-Fi or Bluetooth. The connected network may transfer to and from the computer system program instructions for execution on the computer, audio and video media data, metadata, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on a storage medium to be processed by the application program. The invention is not limited to a particular memory system. Time-based media may be stored on and input from magnetic or optical discs, which may include an array of local or network attached discs, or via local or wide area networks via network interfaces.

A system such as described herein may be implemented in software or hardware or firmware, or a combination of the three. The various elements of the system, either individually or in combination may be implemented as one or more computer program products in which computer program instructions are stored on as computer readable storage medium for execution by a computer, or transferred to a computer system via a connected local area or wide area network. As used herein, such computer readable storage medium is of a non-transitory nature. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of controlling usage of a software application running on a client computer, the method comprising:
   over a local device network receiving at a mobile device a request from the client computer to authorize the running of the software application on the client computer, wherein the request includes identification information, and wherein entitlement information for the software application is stored on the mobile device;
   in response to receiving the authorization request from the client computer, sending over a wide area cellular network from the mobile device to an entitlement server a request for updated entitlement information pertaining to the software application;
   over the wide area cellular network, receiving at the mobile device from the entitlement server updated entitlement information pertaining to the software application; and
   updating the entitlement information stored on the mobile device with the received updated entitlement information pertaining to the software application;
   comparing the identification information with the updated entitlement information stored on the mobile device; and
   if the updated entitlement information stored on the mobile device includes a valid entitlement for the software application corresponding to the identification information:
      sending over the local device network from the mobile device to the client computer an authorization message, wherein the authorization message, when received by the client computer, enables the client computer to run the software application on the client computer; and
      sending over the wide area cellular network from the mobile device to the entitlement server an indication that a copy of the software application is running under the valid entitlement corresponding to the identification information.

2. The method of claim 1, further comprising:
   if the entitlement information stored on the mobile device does not include a valid entitlement corresponding to the identification information, sending a deactivation message to the client computer to deactivate the software application.

3. The method of claim 2, wherein the deactivation message causes the software application to become at least partially inoperative on the client computer after a predetermined time interval after receipt of the deactivation message by the client computer.

4. The method of claim 1, wherein the identification information identifies a user of the client computer.

5. The method of claim 1, wherein the identification information identifies the client computer.

6. The method of claim 1, further comprising repeating the steps of claim 1 at pre-specified intervals.

7. The method of claim 1, wherein entitlement information for a plurality of different software applications, including the first-mentioned software application, is stored on the mobile device, and wherein the mobile device receives authorization requests for each of the plurality of software applications and responds by sending one of an authorization message and a deactivation message directed to each of the plurality of software applications.

8. The method of claim 1, wherein, if a response to the request from the client computer to authorize the running of the software application on the client computer is not received by the client computer, the software application is rendered at least partially inoperative on the client computer after a predetermined time interval after the request from the client computer to authorize the running of the software application was sent.

9. The method of claim 1, wherein the mobile device is a smartphone.

10. A method of controlling activation of a software application on a client computer, the method comprising:
   over a local device network receiving at a mobile device an activation request from the client computer to activate the software application, wherein the activation request includes identification information, and wherein entitlement information for the software application is stored on the mobile device;
   in response to receiving the activation request from the client computer, sending over a wide area cellular network from the mobile device to an entitlement server a request for updated entitlement information pertaining to the specified one of the plurality of software applications;

over the wide area cellular network receiving at the mobile device updated entitlement information pertaining to the software application from the entitlement server; and updating the entitlement information stored on the mobile device with the received updated entitlement information pertaining to the software application;

comparing the identification information with the updated entitlement information stored on the mobile device; and if the updated entitlement information stored on the mobile device includes a valid entitlement for the software application corresponding to the identification information;:

sending an activation message over the local device network from the mobile device to the client, wherein receipt of the activation message enables the user to activate the software application on the client; and sending over the wide area cellular network from the mobile device to the entitlement server an indication that a copy of the software application has been activated under the valid entitlement corresponding to the identification information.

11. The method of claim 10, further comprising:

outputting on the mobile device a notification of receipt of the activation request and a request for permission from a user of the mobile device to activate the software application on the client computer; and wherein the step of sending the activation message is conditional upon receiving permission from the user of the mobile device.

12. The method of claim 10, wherein the valid entitlement information corresponding to the identification information includes entitlements for a licensed number of copies of the software application, and wherein sending the activation message is conditional upon a number of currently activated copies of the software application being less than the licensed number.

13. The method of claim 12, wherein the mobile device maintains a record of the number of currently activated copies of the software application.

14. The method of claim 10 further comprising:

enabling a user of the mobile device to purchase an entitlement for the software application by executing an electronic transaction with a remote entitlement server; and updating the entitlement information stored on the mobile device to reflect the purchase.

15. A computer program product comprising:

a non-transitory storage medium including instructions for a processor to execute, such that when the processor executes the instructions a process for controlling usage of a software application running on a client computer is performed, the process comprising:

over a local device network receiving at a mobile device a request from the client computer to authorize the running of the software application on the client computer, wherein the request includes identification information, and wherein entitlement information for the software application is stored on the mobile device;

in response to receiving the authorization request from the client computer, sending over a wide area cellular network from the mobile device to an entitlement server a request for updated entitlement information pertaining to the software application;

over the wide area cellular network, receiving at the mobile device updated entitlement information pertaining to the software application from the entitlement server; and updating the entitlement information stored on the mobile device with the received updated entitlement information pertaining to the software application;

comparing the identification information with the updated entitlement information stored on the mobile device; and if the updated entitlement information stored on the mobile device includes a valid entitlement for the software application corresponding to the identification information:

sending over the local device network from the mobile device to the client computer an authorization message, wherein the authorization message, when received by the client computer, enables the client computer to run the software application on the client computer; and sending over the wide area cellular network from the mobile device to the entitlement server an indication that a copy of the software application is running under the valid entitlement corresponding to the identification information.

16. A mobile device comprising:

a processor for executing instructions;

a local device network interface connected to the processor;

a memory connected to the processor, the memory including instructions which, when executed by the processor, cause the portable device to implement a process for controlling usage of a software application running on a client computer, the process comprising:

receiving via the local device network interface a request from the client computer to authorize the running of the software application on the client computer, wherein the request includes identification information, and wherein entitlement information for the software application is stored on the mobile device;

in response to receiving the authorization request from the client computer, sending over a wide area cellular network to an entitlement server a request for updated entitlement information pertaining to the software application;

over the wide area cellular network receiving from the entitlement server updated entitlement information pertaining to the software application; and updating the entitlement information stored on the mobile device with the received updated entitlement information pertaining to the software application;

comparing the identification information with the updated entitlement information stored in the memory; and if the updated entitlement information stored on the mobile device includes a valid entitlement for the software application corresponding to the identification information:

sending to the client computer via the local device network interface an authorization message, wherein the authorization message, when received by the client computer, enables the client computer to run the software application; and sending over the wide area cellular network to the entitlement server an indication that a copy of the software application is running under the valid entitlement corresponding to the identification information.

* * * * *